US006666735B2

(12) United States Patent
Benoit

(10) Patent No.: US 6,666,735 B2
(45) Date of Patent: Dec. 23, 2003

(54) JET DRIVE ASSIST FOR OFF-ROAD VEHICLE WITH FLOTATION

(76) Inventor: Dion Benoit, Box 20611 Whitehorse, Yukon (CA), Y1A 7A2

(*) Notice: Subject to any disclaimer, the term of this patent is extended or adjusted under 35 U.S.C. 154(b) by 0 days.

(21) Appl. No.: 10/122,944

(22) Filed: Apr. 11, 2002

(65) Prior Publication Data

US 2003/0194923 A1 Oct. 16, 2003

(51) Int. Cl.⁷ .................................................. B60F 3/00
(52) U.S. Cl. ................................. 440/12.5; 440/12.55
(58) Field of Search ............................ 440/12.5, 12.51, 440/12.55

(56) References Cited

U.S. PATENT DOCUMENTS

| | | |
|---|---|---|
| 3,199,486 A | 8/1965 | Gillois et al. |
| 3,664,451 A | 5/1972 | Rogers et al. |
| 3,765,368 A | 10/1973 | Asbeck |
| 4,085,697 A | 4/1978 | Gaasenbeek |
| 4,522,420 A | 6/1985 | Hannappel |
| 4,687,447 A | 8/1987 | Hannappel |
| 4,744,324 A | 5/1988 | Martinmaas |
| 4,926,777 A | 5/1990 | Davis, Jr. |
| 4,966,244 A | 10/1990 | Somerton-Rayner |
| 5,291,846 A | 3/1994 | Davis, Jr. |
| 5,531,652 A | 7/1996 | Hall, III et al. |
| 5,832,862 A | 11/1998 | Hulten |
| 5,881,831 A | 3/1999 | Harvey |
| 5,993,273 A | 11/1999 | Adams |

FOREIGN PATENT DOCUMENTS

| | | | |
|---|---|---|---|
| CA | 1059034 | 7/1979 | |
| CA | 1285428 | 7/1991 | |
| CA | 2177463 | 11/1997 | |
| DE | 29815500 U1 | 7/1998 | |
| DE | 19831324 | 1/2000 | |
| DE | 19912607 | 9/2000 | |
| FR | 2411095 | 12/1977 | |
| FR | 2755092 | 4/1998 | |
| GB | 2254831 A | * 10/1992 | ............ B60F/3/00 |
| GB | 2287910 | 10/1995 | |
| JP | 2185811 A2 | 4/1989 | |
| WO | WO9924273 | 5/1999 | |
| WO | WO0076794 A1 | 12/2000 | |

* cited by examiner

Primary Examiner—Jesus D. Sotelo
(74) Attorney, Agent, or Firm—Gene Scott-Patent Law & Venture Group

(57) ABSTRACT

A vehicular drive apparatus comprises in combination, an off-road vehicle including an internal combustion engine drive system and a liquid propulsion jet drive system jointly functional in a single engine case of the off-road vehicle for enabling forward motion of the vehicle. The jet drive system provides a means for engaging and disengaging with the internal combustion engine drive system. An outrigger floatation device engages with the off-road vehicle and is adapted for adjustment between a stored attitude and a deployed attitude. When the vehicle enters deep water, the jet drive may be employed to propel the vehicle, and the floatation gear may be employed to maintain buoyancy.

9 Claims, 4 Drawing Sheets

JET DRIVE ASSIST FOR OFF-ROAD VEHICLE WITH FLOTATION

BACKGROUND OF THE INVENTION

INCORPORATIONS: The following U.S. patent documents are made a part of the present disclosure and specification and are therefore incorporated by reference in order to teach several of the known portions of the present invention: U.S. Pat. No. 4,085,697 to Gaasenbeek, U.S. Pat. No. 4,522,420 to Hannappel, U.S. Pat. No. 4,687,447 to Hannappel, and U.S. Pat. No. 4,744,324 to Martinmaas.

1. Field of the Invention

This invention relates generally to mechanical drives for vehicles and more particularly to a combination internal combustion engine and jet drive system for an off-road vehicle.

2. Description of Related Art

The following art defines the present state of this field:

Gillois et al., U.S. Pat. No. 3,199,486 describes an amphibious vehicle having a body adapted to be armored and having power driven front and rear axles connected with front and rear wheels for travel on land, propeller means for travel on water; and drive means for said front and rear wheels and for said propeller means, said wheels being equipped with oversized, shot-proof low pressure tires, the tires for said power driven front wheels projecting ahead of said body, and said drive means including transmission means selectively operative to drive said front and said rear wheels together, said wheels and said propeller means simultaneously, and said propeller means separately, and said transmission mean including a propeller driving transmission portion and a land driving transmission portion operative at a land traveling speed not exceeding the speed of water travel, said propeller driving transmission portion including a horizontal drive shaft and said propeller means including a propeller drive shaft extending perpendicularly to said horizontal drive shaft and being connected thereto and pivotally movable about its own axis and about the axis of said horizontal drive shaft.

Rogers et al., U.S. Pat. No. 3,664,451 describes a vehicle having front and rear body sections rotatably interconnected along the longitudinal axis of the body sections. An engine is located in the front body section and a drive shaft extends through the coupling between the body sections through the compartment of the rear body section and to a gear box on a rear axle located entirely outside of the compartment of the rear body section. The rear axle is supported by frame members extending rearwardly from the rear body section. A wall extends horizontally over the rear axle and provides a seat for the compartment in the rear body section. A propeller may be connected to a drive shaft extending rearwardly from the gear boxy on the rear axle.

Asbeck, U.S. Pat. No. 3,765,368 describes an amphibious vehicle is propelled by a conventional inboard mounted engine which is connected by conventional automobile transmission and differential mechanisms for driving a pair of wheels on land and also connected with a conventional inboard-outboard marine drive mechanism, all of the wheels being mounted on air suspension means which are pivotally connected with the hull to allow the wheels to be raised for marine use.

Gaasenbeek, U.S. Pat. No. 4,085,697 describes a steering and transmission arrangement for an off-road all-terrain vehicle providing for the drive ratios to each of the vehicle wheels to be geared up and down in unison so that each wheel receives a torque which is an average of the torque requirements of all the wheels. Steering is effected by varying the drive ratios to the left-hand and right-hand wheels differentially so that the wheels on one side are speeded up and the wheels on the other side are slowed down. The wheels are supported independently on longitudinally-extending legs pivotally connected on the vehicle body. Problems of stress on the drive train as the wheel legs rock up and down on rough terrain are avoided through a speed-reducing coupling at the pivotal leg connection and a torsional energy-storing drive shaft between the coupling and the wheel which absorbs small torques induced by the rocking of the legs and by rotational advancements and retardations of the wheels as they ride over local bumps in the terrain.

Hannappel, U.S. Pat. No. 4,522,420 describes structurally integrated equipment that is selectively, individually or conjointly detachably attachable to a three-wheeled vehicle for preventing rearward tip over, carrying cargo, rendering the vehicle waterborne, enhancing travel over snow or providing power takeoff. Supports extending from the framework of the vehicle are adapted to receive and retain with quick disconnect fittings frame elements of the equipment. The frame elements may be adjustable to accommodate load variations and variances of the surface traversed.

Hannappel, U.S. Pat. No. 4,687,447 describes structurally integrated equipment that is selectively, individually or conjointly detachably attachable to a three-wheeled vehicle for preventing rearward tip over, carrying cargo, rendering the vehicle waterborne, enhancing travel over snow or providing power takeoff. Supports extending from the framework of the vehicle are adapted to receive and retain with quick disconnect fittings frame elements of each of the equipments. The frame elements may be adjustable to accommodate load variations and variances of the surface traversed.

Martinmaas, U.S. Pat. No. 4,744,324 describes a self-propelled all terrain vehicle that is converted to amphibious operation by means of an amphibious conversion kit that provides rear axle extensions to mount outer rear wheels that dualize the rear wheels, and radial paddle elements on the extensions between the dual rear wheels. Over-size tires on the dual rear wheels and on front wheel means of the vehicle provide flotation means capable of supporting the vehicle and a desired load in water.

Davis, Jr., U.S. Pat. No. 4,926,777 describes an aquatic wheelchair having a main flotation body of thermoplastic material of closed cell construction including a seat portion and an integral backrest portion. Flotation paddle wheels are connected to the seat portion and a flotation stabilizer wheel assembly is detachably connected to the backrest portion. The flotation paddle wheels are constructed and arranged to facilitate the grasping thereof by the user for manually propelling the wheelchair not only on soft terrain but also in water.

Somerton-Rayner, U.S. Pat. No. 4,966,244 describes an all-terrain vehicle with eight wheels on four equidistant axles all driven from a single engine via two transfer boxes and differential gear units on each axle. The axles are fully floating beam axles on long travel coil springs and controlled by radius arms and Panhard rods. The radius arms may be parallel to and co-extensive with the respective propeller shafts coupling the differential gears to the transfer boxes and the connections between the propeller shafts and the transfer box outputs include torsional vibration dampers.

The couplings at the ends of each propeller shaft to the transfer box and the differential gear unit comprise respective universal joints, and the yokes of the universal joints at opposite ends of the propeller shaft are set to be rotationally out of phase, with the driven yoke lagging the driving yoke. A dual circuit braking system with a deceleration sensing valve can be provided to limit the hydraulic pressure to the front wheel brakes.

Davis, Jr., U.S. Pat. No. 5,291,846 describes an amphibious mobility assist vehicle for mobility impaired persons wherein a main flotation body has a catamaran configuration of twin hulls and constructed of molded thermoplastic material filled with plastic foam material of closed cell construction. A pair of conventional wheelchair-type wheels are detachably connected to the rear portion of the main flotation body on each side of a seat portion thereof, and a pair of hollow, spherical, flotation, caster mounted wheels are connected to the front of each hull. A manually actuated lift mechanism, which is accessible to the occupant of the vehicle, is connected to each spherical wheel so that the spherical wheels can be individually moved from a ground engaging position to an elevated position when the vehicle is floating in a body of water.

Hall, III et al., U.S. Pat. No. 5,531,652 describes a power transmission for a vehicle which operates on land and in water has an engine driven torque converter, a planetary gear arrangement and a pair of output members. The water or sea-drive is connected with one output member, which is connected to the planetary gear arrangement through a selectively engagable clutch. The land-drive is connected with the other output, which is connected with the torque converter through a selectively engagable clutch. The torque converter turbine is connected with a member of the planetary gear arrangement and is selectively connectible with the impeller through a selectively engagable bypass or torque converter clutch.

Hulten, U.S. Pat. No. 5,832,862 describes an amphibious vehicle with a watertight body and including a deck extending rearwardly from the occupant compartment to a rear end. The vehicle is characterized by the occupant compartment including an L-shaped hatch having a top leg forming a portion of the top of the vehicle and a rear leg forming the rear of the occupant compartment in the closed position. The hatch is hinged to the top for movement between an open and closed position. The rear leg includes a rear window for use when the hatch is closed during land operation and the top leg includes a water windshield for use when the hatch is open during marine operation. In the open position, the rear leg is disposed horizontally above the deck forming a roof over the deck with the top leg disposed at an angle extending downwardly from the rear leg to the top of the vehicle.

Harvey, U.S. Pat. No. 5,881,831 describes a multi-terrain amphibious vehicle adapted for travel across surfaces of various type and attributes. The vehicle includes a chassis assembly (10), which extends in a longitudinal direction; a plurality of propulsion members rotatably coupled to that chassis assembly for propelling the vehicle across a given surface; and, a control mechanism for controlling the rotational velocities and phases of the propulsion members. The propulsion members each rotate about an axis that extends in a direction substantially normal to the longitudinal direction. Each propulsion member includes, for engaging the given surface, at least a first perimeter segment and a second perimeter segment coaxially disposed in angularly offset manner about its rotation axis. The first perimeter segment has an arcuate contour and extends radially farther from the rotation axis than does the second perimeter segment. In operation, the propulsion members are cooperatively rotated to collectively impart a predetermined speed and direction of travel to the vehicle.

Adams, U.S. Pat. No. 5,993,273 describes an improved amphibious all terrain vehicle having a substantially rectangular body or shell and is constructed of a lightweight durable metallic material. A combustion gas engine is coupled to a dual hydraulic pump system, which is centrally mounted within the length direction of the cavity for easy access and removal for repairs. An oil tank serves also as a seat base and is disposed within a central portion of the shell. Six-independent wheel motors are symmetrically disposed in series, three on each side of the shell and are plumbed in series for ground-based mobility respectively. The wheels coordinate with a propeller disposed in the rear for amphibious propulsion. A fan is mounted on the under side of a front hood, near a dual lever, and switch controls for respective propulsion systems, and night-lights mounted on the hood respectively.

Baker, WO 99/24273 describes an amphibious vehicle having a drive system comprising a driven wheel of the vehicle with which is associated a guide having inlet and outlet means and the wheel being formed such that when the wheel is in water its rotation draws water into the guide via said inlet, compresses that water and feeds it to the outlet. The driven wheel of the vehicle has the form of an impeller operable to draw water into the guide and feed it to the outlet means. The guide is formed in two parts on opposed sides of the wheel, the first part having one or more apertures opening forwardly of the direction of movement of the vehicle and forming inlet means whilst the second part has a jet rearwardly and upwardly of the direction of forward movement of the vehicle. Each part is formed with means providing a seal between it and the rim of the driven wheel. The parts are carried with the driven wheel. The vehicle described is motor tricycle having a pair of front wheels and a single rear driven wheel. The front wheels of the vehicle have mudguards, which when in water may be rotated to underlie the vehicle wheels and form skies to ease the forward movement of the vehicle through the water. Running boards extend rearwardly of the mudguards to help in planning. The second part of the guide arrangement has an outlet coupled to a number, six, steering jets mounted on the body of the vehicle.

Lent-Phillips et al., WO 00/76794 describes an amphibious vehicle which is provided with an open seating arrangement and which comprises a drive motor for reciprocally or simultaneously driving an all-wheel drive traveling mechanism and a swimming drive that is configured as a jet drive by means of at least two clutches that operate independently of one another, whereby the drive motor is arranged underneath the seating arrangement in an essentially central manner between the axles of the traveling mechanism.

Gaasenbeek CA 1,059,034 describes an all-terrain vehicle.

Siren, CA 1,285,428 describes an all-terrain amphibian vehicle.

Lacasse, CA 2,177,463 describes a float system for all wheel drive ATV in which two lateral floats are detachably secured along the sides of the ATV. The floats are so dimensioned and positioned as to permit unassisted entry into the water and beaching without changing the height of the floats relative to the chassis of the ATV. Paddle wheels on the rear axle provide propulsion while a rudder assembly in close proximity behind the paddle wheels allows steering of the ATV when waterborne.

Roche, FR 2755092 describes a propulsion system for amphibious vehicles comprising a water flow generator fixed on the wheel, which transmits this flow into a jet corrector. The corrector is rotated freely by the induced flow about the wheel axis and locked in the desired position by an indexer. The indexer is connected to the wheel axle and the chassis by an arm pivoting about the wheel axle and sliding in the chassis. A plate carrying inclined fins fixed to the vehicle wheel constitutes the water flow generator. A casing coaxial with the generator and free to rotate relative to it and open on its external surface constitutes the flow corrector.

Arnold, DE 19912607 describes a drive including a water pump, which is fitted to the boat below the waterline. It consists of a casing and a rotating scoop wheel inside it. The scoop wheel axle is perpendicular to the direction of travel and parallel to the horizon. Water enters directly into the wheel, which is open at the side, and leaves tangentially to the wheel through an aperture in the casing. The wheel can roll on dry land. If the casing is turned through 180 deg, the thrust is reversed.

McTaggart, GB 2287910 describes an amphibious vehicle for carrying heavy weight in the form of cargo or passengers comprising a load carrying platform, and engine for driving the vehicle on land via road wheels, a water jet propulsion unit for propelling the vehicle in water, and inflatable means disposed about the sides of the vehicle for providing a buoyancy aid in water.

Sugimoto, JP 0106475 describes an amphibious vehicle that permits traveling on both land and water with a single engine by providing a propelling device driven by an overland traveling drive source for water jet system water traveling and providing a wave putting-down plate for preventing air from entrance into an intake port above the propelling device.

The prior art teaches the use of amphibious vehicles, rear wheel drive systems, all terrain vehicles, floatation devices used with all terrain vehicles, conversion of such vehicles to wading and floating propulsion, but does not teach a combination IC and jet engine propulsion and outrigger floatation devices. The present invention fulfills these needs and provides further related advantages as described in the following summary.

SUMMARY OF THE INVENTION

The present invention teaches certain benefits in construction and use which give rise to the objectives described below.

The present invention is an off-road vehicle including a drive apparatus comprising in combination, an off-road vehicle including a conventional engine drive system and a liquid propulsion jet drive system jointly functional in a single engine case of the off-road vehicle for enabling forward motion of the vehicle. The jet drive system provides a means for engaging and disengaging with the conventional engine drive system. An outrigger floatation device engages with the off-road vehicle and is adapted for adjustment between a stored attitude and a deployed attitude. When the vehicle enters deep water, the jet drive may be employed to propel the vehicle, and the floatation gear may be employed to maintain buoyancy.

A primary objective of the present invention is to provide an apparatus and method of use of such apparatus that provides advantages not taught by the prior art.

Another objective is to provide such an invention capable of forward propulsion on land as well as in shallow water and deep water.

A further objective is to provide such an invention capable of both wheeled and jet drive, independently or in combination.

A still further objective is to provide such an invention capable of employing flotation devices for floating the vehicle in deep water.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention in at least one of its preferred embodiments, which is further defined in detail in the following description.

Figure 1:
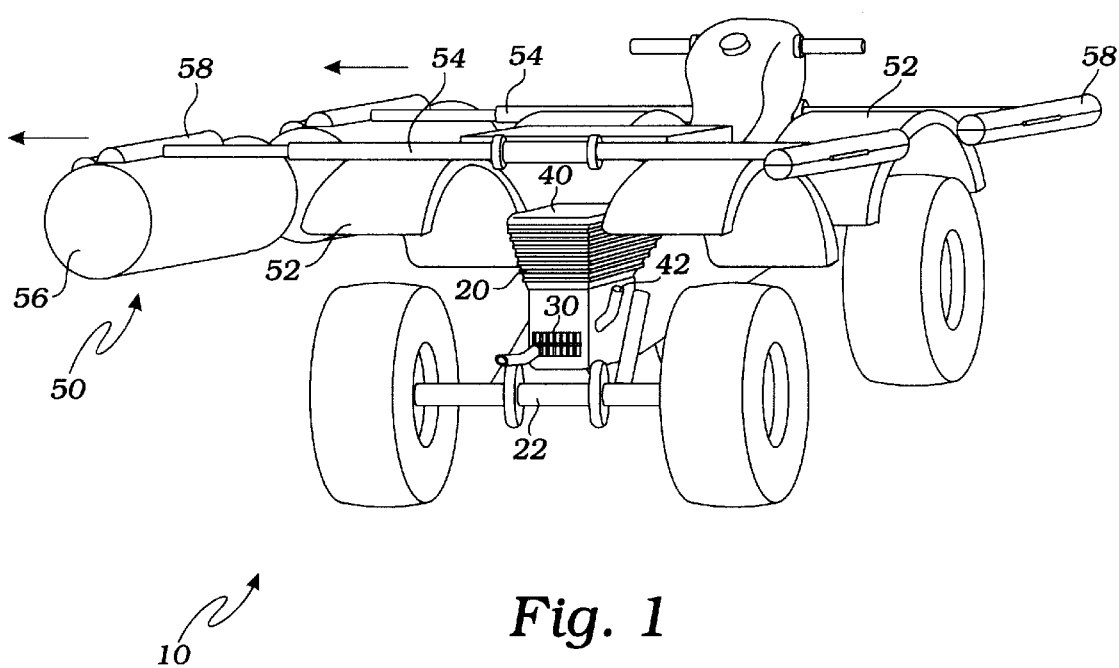
FIG. 1 is a perspective view of the preferred embodiment of the invention.
Figure 2:
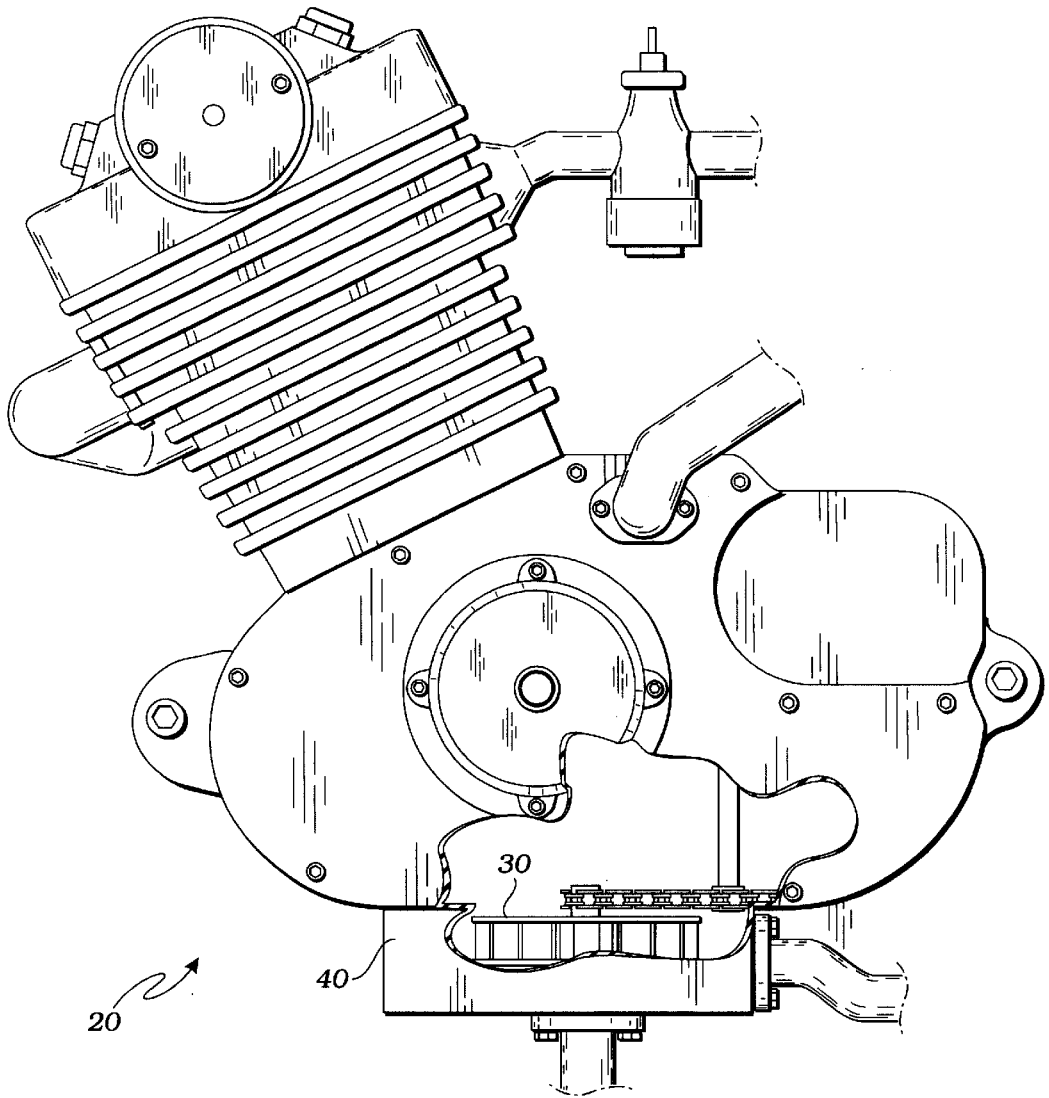
FIG. 2 is a side elevational view of a power system thereof.

The present invention is an off-road vehicle 10 having both a conventional engine such as an internal combustion engine drive system 20 and a liquid propulsion jet drive system or turbine 30 jointly functional in a single engine case 40 as best seen in FIG. 2 of the drawing set. The conventional engine system may be a four-stroke or a two-stroke engine as is well known, or a fuel cell engine, etc. as is known in the art. The vehicle 10, as for instance that shown in FIG. 1, is preferably of the four-wheel all terrain type that is very well known and in broad use, or may also be of the three-wheel type. Both of these vehicles are well defined in the incorporated references. These vehicles are usually driven by an IC reciprocating engine for enabling forward motion of the vehicle through rear wheel drive. In the present invention, a means for engaging and disengaging 42 of the jet drive system 30 for its functional operation along with the internal combustion engine drive system 20 is provided, and FIGS. 3 and 4 define one way of accomplishing this. A detailed description is provided below. Clearly, the jet drive system 30 may be coupled to the IC engine in several well-known ways including the use of conventional clutches. An outrigger floatation means 50 is engaged with the off-road vehicle 10, as shown in FIG. 1, and is adapted for adjustment between a stored attitude, shown on the right, and a deployed attitude, shown on the left, for use when the vehicle wades across a body of water too deep for the vehicle. Such floatation devices may be moved or steered to allow change of direction of the vehicle when it is floating.

Preferably, the internal combustion engine drive system 20 includes a four-stroke engine and a drive train coupling the engine to a drive axle 22 of the all terrain vehicle as is very well known in the art. The liquid propulsion jet drive system 30 is a variable speed turbine of any type well known in the art, as for instance those used in personal watercraft and is driven by the IC engine directly.

Figure 4:
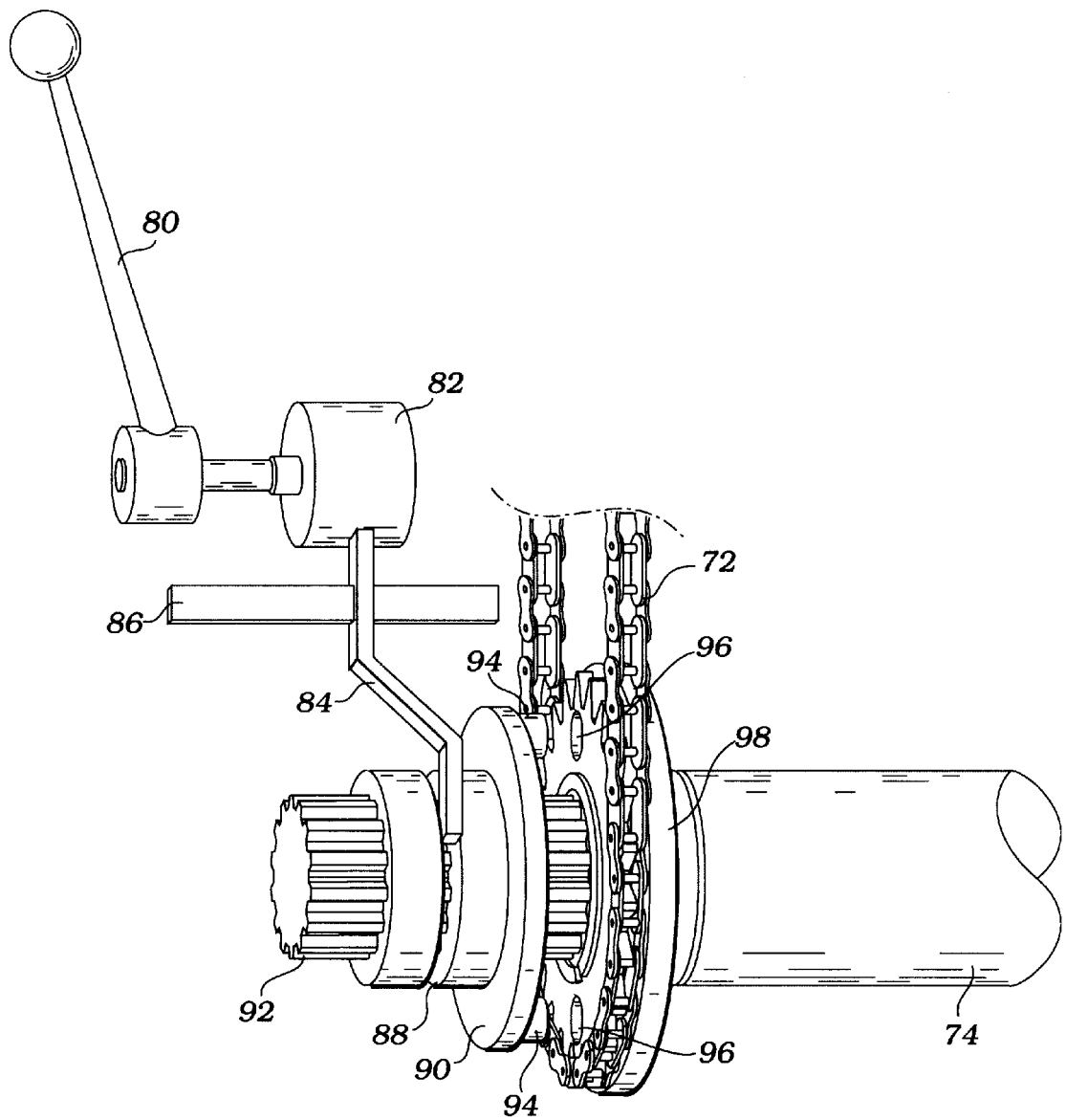

Preferably, the means for engaging and disengaging is a spline gear set with manual lever as shown in FIG. 4.

Preferably, the outrigger floatation means 50 is independently mounted on each rack of a front and a rear cargo racks 52 of the off-road vehicle 10 as shown in FIG. 1, and comprises rigid frame members 54 fixed to, and extendable telescopically laterally from the vehicle 10, the rigid frame members providing inflatable pontoons 56. Preferably, the pontoons are adapted for being inflated by at least one of hand pump, portable compressor, and compressed gas cartridge and by mouth, all of which is well known in the art. Alternative means for inflating the pontoons will be known as well. The pontoons 56 are elongated gas bags which, when deflated, are stored in split cases 58 mounted at the ends of the frame members 54. To reiterate, FIG. 1 shows the state when the pontoon 56 is stored, at the right side of the vehicle 10, while, the pontoon 56 is shown deployed at the left side of the vehicle 10.

Figure 3:
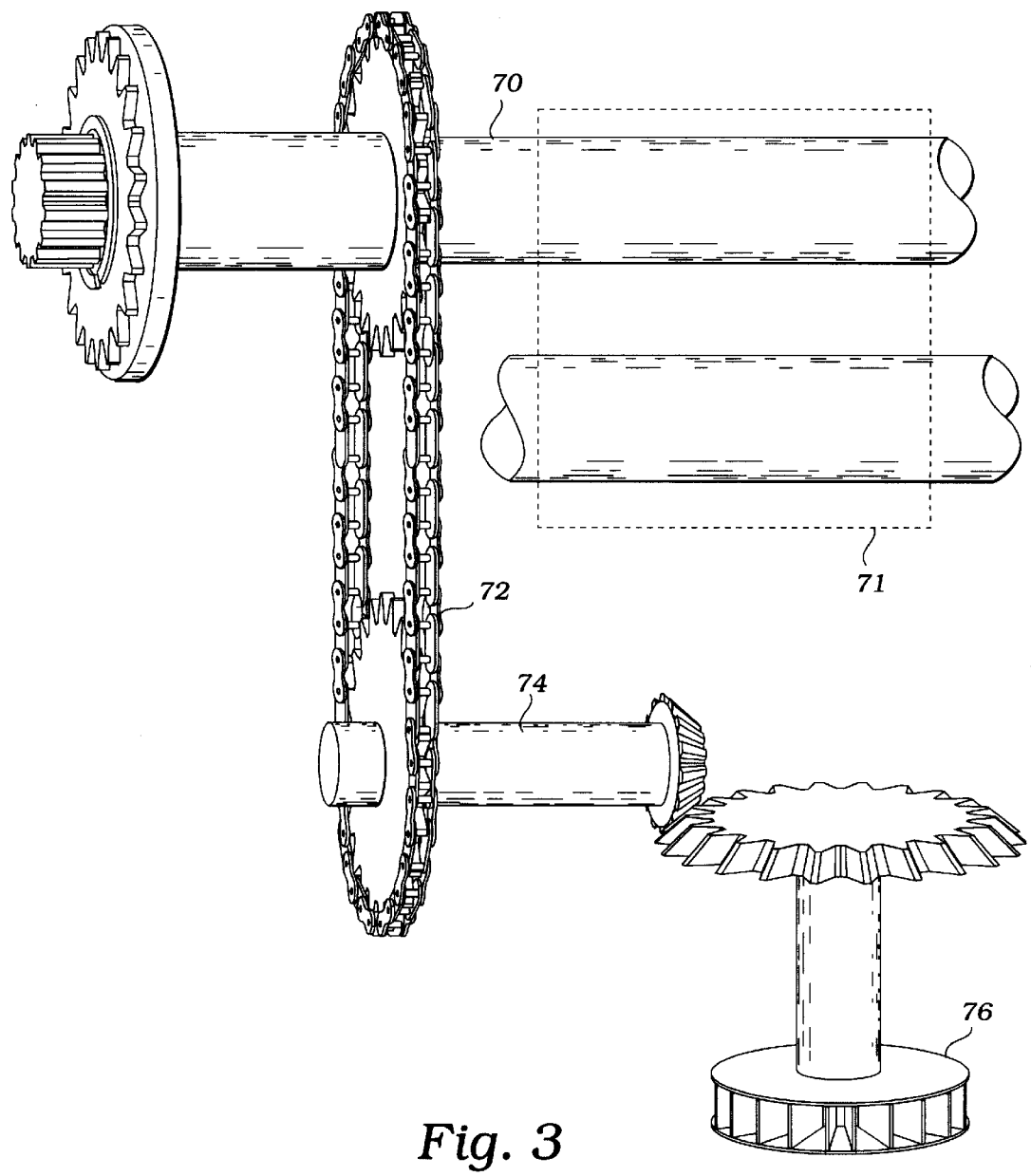
FIGS. 3 and 4 are schematic diagrams of a means for coupling a turbine drive with a standard IC drive thereof.

In order to teach the joint operation of the two power drives of the present invention, we now define the manner of operation of the apparatus shown in FIGS. 3 and 4. In FIG. 3 is shown an output shaft 70, which is part of the transmission section 71 of the ATV's engine. An internal chain drive 72 propels a turbine shaft 74, which is coupled, via bevel gears to turbine 76. The output shaft drives the rear axle of the ATV. As shown in more detail in FIG. 4 we see a lever 80 is used to rotate a shift drum 82 and a shift fork 84, which operates through a fork guide 86. A fork groove 88 of an engagement sprocket 90 is fitted for accepting the shift fork 84. Pressure acting on the shift fork 84 causes the engagement sprocket 90 to slide along the turbine shaft slip-spline 92 to engage its stems 94 into receiving holes 96 of an idler sprocket 98 and thus provide rotating force from the output shaft 70 to the turbine shaft 74. Disengagement is achieved through the opposite actions. In this manner the output shaft of the ATV is able to drive both the rear wheels directly, as well as the turbine.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A vehicular apparatus comprising in combination: an off-road vehicle including an internal combustion engine drive system and a liquid propulsion jet drive system jointly functional in a single engine case of the off-road vehicle for enabling forward motion thereof, a means for engaging and disengaging the jet drive system for operation thereof with the internal combustion engine drive system, and an outrigger floatation means integrally mounted on a front and a rear cargo racks of the off-road vehicle.

2. The apparatus of claim 1 further comprising outrigger floatation means engaged with the off-road vehicle and adapted for adjustment between a stored attitude and a deployed attitude.

3. The apparatus of claim 1 wherein the off-road vehicle is an all terrain vehicle.

4. The apparatus of claim 1 wherein the internal combustion engine drive system includes a four-stroke engine and a drive train coupling the engine to a drive axle of the all terrain vehicle.

5. The apparatus of claim 1 wherein the liquid propulsion jet drive system is a variable speed turbine.

6. The apparatus of claim 1 wherein the means for engaging and disengaging is a spline gear set.

7. The apparatus of claim 1 wherein the outrigger floatation means comprises rigid frame members extendable laterally from the vehicle, the rigid frame members providing inflatable pontoons stored in split cases.

8. The apparatus of claim 7 wherein the outrigger floatation means on the front cargo rack is independent of the outrigger floatation means on the rear cargo rack such that entry to a rider for mounting the apparatus is not blocked.

9. The apparatus of claim 7 wherein the pontoons are adapted for being inflated by one of hand pump, portable compressor, compressed gas cartridge and by mouth.

* * * * *